Jan. 22, 1935.   C. S. STARRICK   1,988,974
LOCKING STRUCTURE
Filed Dec. 5, 1933
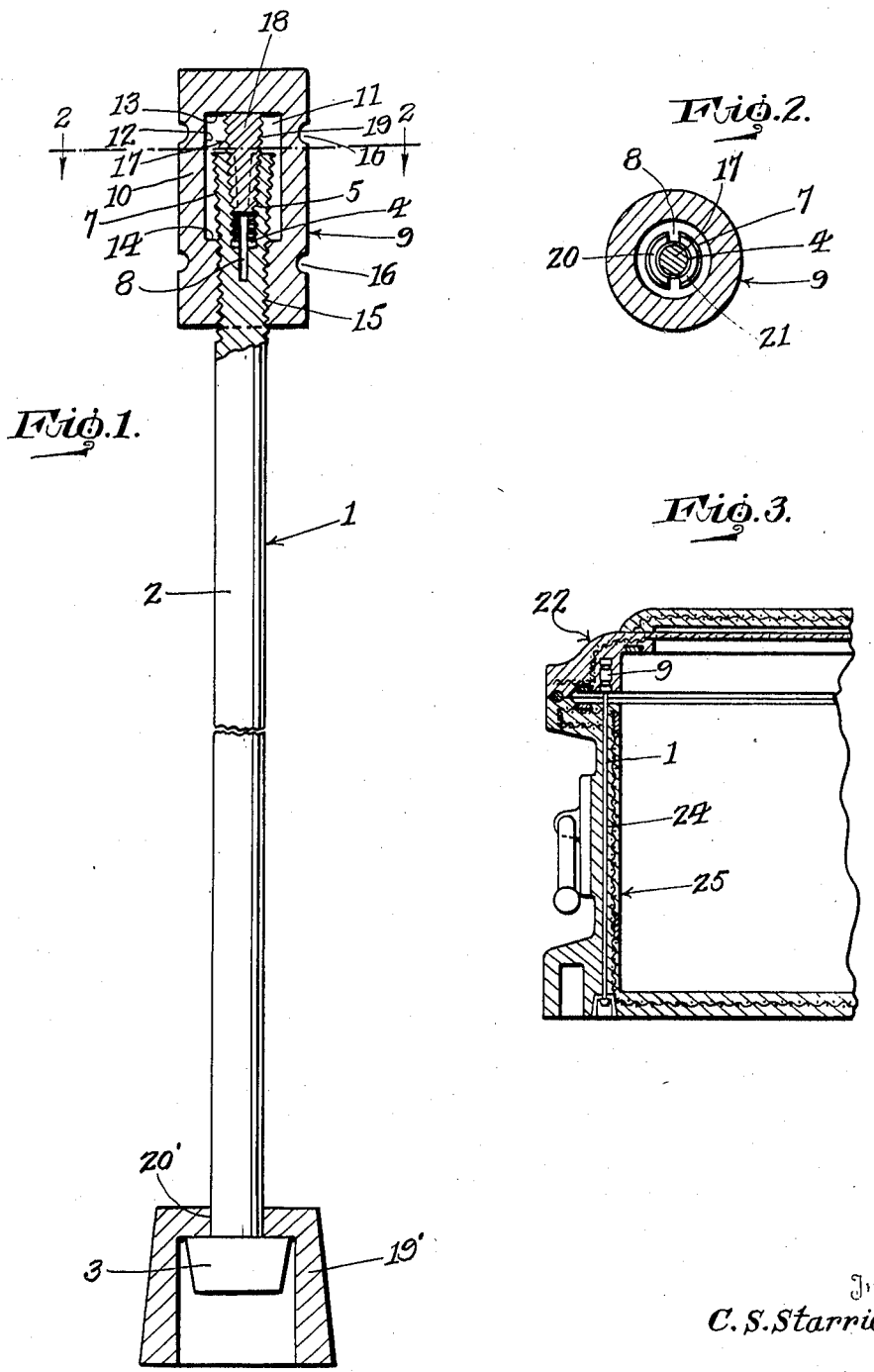
Inventor
C. S. Starrick
Geo. P. Kimmel
Attorney Patented Jan. 22, 1935

1,988,974

UNITED STATES PATENT OFFICE 1,988,974

LOCKING STRUCTURE

Claud S. Starrick, Waterville, Ohio

Application December 5, 1933, Serial No. 701,037

4 Claims. (Cl. 151—31)

This invention relates to a locking structure designed primarily for use for securing together the lid and body portion of a casket, but it is to be understood that a locking structure in accordance with this invention may be employed in any connection for which it may be found applicable, and the invention has for its object to provide, in a manner as hereinafter set forth, a structure of the class referred to including a series of coacting and interengaging parts so constructed that when the device is set up in locking relation with respect to the elements which are to be secured together thereby, the said parts are permanently locked together to prevent the separation thereof, as well as the separation of the secured together elements without demolishing the latter. This application is a continuation in part of copending application Serial Number 572,375 which has resulted in Patent Number 1,950,823.

A further object of the invention is to provide, in a manner as hereinafter set forth, a locking structure which, when in connecting position with respect to a plurality of elements will be permanently locked and not releasable.

Further objects of the invention are to provide, in a manner as hereinafter set forth, a locking structure for the purpose referred to which is simple in its construction and arrangement, strong, durable, not releasable when in locking position, thoroughly efficient in its use, conveniently adjusted to locking position, and inexpensive to manufacture.

To the above ends essentially and to others which may hereinafter appear, the invention consists of such parts, and such combination of parts which fall within the scope of the invention as claimed.

In the drawing:

Figure 1 is an elevation partly in lengthwise section of the locking structure.

Figure 2 is a section on line 2—2 Figure 1.

Figure 3 is a fragmentary view of a casket showing the adaptation of the locking structure with respect to the lid and body portion of the casket.

The structure includes a bolt 1 formed of a shank 2 of the desired length provided at one end with a head 3. The other end of shank 2 is formed with a lengthwise extending socket 4 having its wall threaded as at 5. That end of shank 2 formed with socket 4 is peripherally threaded as at 7. The body of threads 7 is of greater length than the depth of socket 4. That end of shank 2 having the socket 4 is split diametrically as at 8. The split 8 is of greater length than the depth of socket 4, but of less length than the body of threads 7.

The locking structure includes an anchoring element 9 for the bolt 1 consisting of a casting 10 of circular cross section formed with a chamber 11 intermediate its ends. The side, outer end and inner end walls of chamber 11 are designated 12, 13 and 14 respectively. The casting 10 at its inner end is provided with an axial opening 15 having its wall threaded throughout and which communicates through the wall 14 with the chamber 11. The outer face of casting 10 is formed with spaced circumferential grooves 16 for a purpose to be referred to. The wall 13 of chamber 11 constitutes an abutment for a combined spreader and locking element 17 which is associated with the bolt 1 and is to be arranged in chamber 11 when it performs its function.

The element 17 consists of a solid reversely tapered body 18 having its periphery threaded throughout as at 19. The element 17 functions to spread apart the separated portions 20, 21 of the bolt 1 provided by the split 8. The diameter of element 17 is materially less than that of shank 1.

The locking structure also includes a vertically disposed inverted cup-shaped combined bearing and retainer element 19' provided at its top with an opening 20' for the passage of the shank 2 of bolt 1. The element 19' is seated upon the head 3 of bolt 1. The element 19' is of frustro-conoidal contour and comprises a hollow body portion gradually decreasing in outer diameter from its bottom to its top. The opening 20' in the top of element 19' is disposed axially thereof and is of materially less diameter than its inner diameter of said body portion. The latter has its inner diameter uniform and of greater diameter than the head 3. The latter has its upper face bearing against the lower face of the top of element 19'. When the element 19' is in position it bears against the walls of the socket formed in the outer face of the bottom of the body of the casket.

When the locking structure is in locking position with respect to the parts, shown by way of example as the lid and body of a casket, which are to be connected together thereby, the bolt 1 and elements 9, 19 and 19' are connected together, as shown in Figure 1. When the structure is to be made active, the element 9 is embedded in one of the parts, the casket lid 22, and the material of the latter fills the grooves 16 whereby element 9 is anchored. The element 9 registers with the lower face of lid 22. The element 17 is arranged relative to bolt 1 so that the smaller end of such element will extend into socket 4, but not to an extent to spread portions 20, 21 of the bolt 1. The bolt 1 and element 17 are then extended up through an opening 24 formed in a wall of the casket body 25 to an extent whereby element 17 and a part of the threaded portion of the bolt will be positioned in the chamber 11. The threads 7 of bolt 1 engage with the threads of the wall of opening 15. The bolt 1 is then screwed into chamber 11 to an extent whereby the larger end of element 17 will abut wall 13 and when further screwed into chamber 11 the threads of element 17 will engage the threads of the wall of socket 4 to an extent to flare the split end of bolt 1 locking the latter and element 9 together and bringing the lid and casket body into tight abutting engagement. As element 17 is separate from element 9, the bolt 1 and element 9 will be permanently locked together and prevent the separation of the lid from the casket body. The head 3 of bolt 1 and the element 19' when the locking structure is in locking position are countersunk in the casket body as at 26.

What I claim is:—

1. A locking structure comprising an adjustable headed bolt having its shank provided with a lengthwise split peripherally threaded end formed with a lengthwise extending socket provided with a threaded wall, an anchoring element formed with a chamber for extension therein of the threaded end of the bolt, said chamber having a closed outer wall constituting an abutment, said element being provided at its inner end with an opening communicating with said chamber, the wall of said opening being threaded for engagement with the peripheral threads of the bolt when the latter is extended into said chamber, and a combined peripherally threaded spreader and locking element for positioning in said chamber to coact with said abutment and the threads of the wall of said socket for flaring the split end of the bolt to lock the latter and anchoring element together, said combined spreader and locking element being free of direct connection to said anchoring element to prevent the separation of the latter from the bolt when the split end of the bolt is flared.

2. A locking structure comprising an adjustable headed bolt having its shank provided with a lengthwise split peripherally threaded end formed with a lengthwise extending socket provided with a threaded wall, an anchoring element formed with a chamber for extension therein of the threaded end of the bolt, said chamber having a closed outer wall constituting an abutment, said element being provided at its inner end with an opening communicating with said chamber, the wall of said opening being threaded for engagement with the peripheral threads of the bolt when the latter is extended into said chamber, a combined peripherally threaded spreader and locking element for positioning in said chamber to coact with said abutment and the threads of the wall of said socket for flaring the split end of the bolt to lock the latter and anchoring element together, said combined spreader and locking element being free of direct connection to said anchoring element to prevent the separation of the latter from the bolt when the split end of the bolt is flared, and said combined spreader and locking element being of circular cross section, of tapered contour and having its larger end abutting said closed outer end wall of said chamber.

3. A locking structure comprising an adjustable headed bolt having its shank provided with a lengthwise split peripherally threaded end formed with a lengthwise extending socket provided with a threaded wall, an anchoring element formed with a chamber for extension therein of the threaded end of the bolt, said chamber having a closed outer wall constituting an abutment, said element being provided at its inner end with an opening communicating with said chamber, the wall of said opening being threaded for engagement with the peripheral threads of the bolt when the latter is extended into said chamber, a combined peripherally threaded spreader and locking element for positioning in said chamber to coact with said abutment and the threads of the wall of said socket for flaring the split end of the bolt to lock the latter and anchoring element together, said combined spreader and locking element being free of direct connection to said anchoring element to prevent the separation of the latter from the bolt when the split end of the bolt is flared, and said anchoring element being of circular cross section and provided on its outer periphery with spaced circumferentially disposed endless grooves.

4. A locking structure comprising an adjustable headed bolt having its shank provided with a lengthwise split peripherally threaded end formed with a lengthwise extending socket provided with a threaded wall, an anchoring element formed with a chamber for extension therein of the threaded end of the bolt, said chamber having a closed outer wall constituting an abutment, said element being provided at its inner end with an opening communicating with said chamber, the wall of said opening being threaded for engagement with the peripheral threads of the bolt when the latter is extended into said chamber, a combined peripherally threaded spreader and locking element for positioning in said chamber to coact with said abutment and the threads of the wall of said socket for flaring the split end of the bolt to lock the latter and anchoring element together, said combined spreader and locking element being free of direct connection to said anchoring element to prevent the separation of the latter from the bolt when the split end of the bolt is flared, said combined spreader and locking element being of circular cross section, of tapered contour and having its larger end abutting said closed outer end wall of said chamber, and said anchoring element being of circular cross section and provided on its outer periphery with spaced circumferentially disposed endless grooves.

CLAUD S. STARRICK.